(12) United States Patent
Chu et al.

(10) Patent No.: US 8,767,680 B2
(45) Date of Patent: Jul. 1, 2014

(54) ROAMING SYSTEM USING WIRELESS ACCESS CONTROLLER TO SELECT ACCESS POINT AND METHOD THEREOF

(75) Inventors: Chiung Yu Chu, New Taipei (TW); Meng Hung Lin, New Taipei (TW)

(73) Assignee: Moxa Inc., New Taipei (TW)

( * ) Notice: Subject to any disclaimer, the term of this patent is extended or adjusted under 35 U.S.C. 154(b) by 203 days.

(21) Appl. No.: 13/187,532

(22) Filed: Jul. 21, 2011

(65) Prior Publication Data

US 2013/0022024 A1    Jan. 24, 2013

(51) Int. Cl.
*H04W 36/08* (2009.01)

(52) U.S. Cl.
USPC .......................................................... 370/332

(58) Field of Classification Search
CPC .................................................... H04W 36/30
USPC ............ 370/229–338; 726/4, 5, 9, 10, 14–21, 726/22, 27, 29
See application file for complete search history.

(56) References Cited

U.S. PATENT DOCUMENTS

| 2006/0104230 A1* | 5/2006 | Gidwani | 370/328 |
| 2008/0316988 A1* | 12/2008 | Lee et al. | 370/338 |
| 2012/0224484 A1* | 9/2012 | Babiarz et al. | 370/235 |

OTHER PUBLICATIONS

Cisco Systems, Inc., "Fast Ethernet 100-Mbps Solutions", 1999, total pp. 13.*

* cited by examiner

*Primary Examiner* — Andrew Chriss
*Assistant Examiner* — Peter Mak
(74) *Attorney, Agent, or Firm* — Chih Feng Yeh; Huntington IP Consulting Co., Ltd.

(57) ABSTRACT

A roaming system using a wireless access controller to select an access point and the method thereof are provided. By sending a signal strength between a station and access points (AP's) detecting the station from each AP to a wireless access controller (WAC), and notifying the station to select one of the APs to connect according to the signal strength between the station and each AP by the WAC, the system and the method can keep connection quality and transmission efficiency of a station, and achieve the effect of fast roaming.

10 Claims, 5 Drawing Sheets

ROAMING SYSTEM USING WIRELESS ACCESS CONTROLLER TO SELECT ACCESS POINT AND METHOD THEREOF

BACKGROUND OF THE RELATED ART

1. Technical Field

The invention relates to a roaming system and the method thereof. In particular, the invention relates to a roaming system using a wireless access controller to select an access point and the method thereof.

2. Related Art

Roaming refers to the behavior that occurs when a station (STA) wants to switch from the wireless signal covering range of a first access point (AP) to that of a second AP.

In current roaming technology, Wi-Fi technology is utilized for different AP's to monitor one another in the same channel and within a specific distance. The AP's can thus detect that a station has moved into the intersection area covered by the wireless signals of two AP's. The method of judging that a station has moved into the intersection area covered by the wireless signals of two AP's is usually done by the station itself. Therefore, the station has to collect a certain amount of packets in order to do so. Only by doing so can the station to select the AP of the best connection quality while confirming about the connection situation.

Therefore, to determine whether a station has moved into the intersection area covered by the wireless signals of two AP's by itself, the station has to sacrifice bandwidth to collect communication packets from the AP's. This reduces data transmission efficiency of the station.

In summary, the prior art has the problem that the station cannot guarantee network connection quality and data transmission efficiency at the same time. It is therefore imperative to provide a better solution.

SUMMARY

In view of the foregoing, the invention discloses a roaming system using a wireless access controller (WAC) to select an AP and the method thereof.

The disclosed roaming system using a WAC to select an AP includes: a station (STA); a first AP for the station to connect and for forwarding first target station register message transmitted from the station; a second AP for transmitting target station query message after detecting the station and for transmitting the signal strength with the station; a WAC for transmitting monitor AP register message via the first AP to the station after receiving the target station query message from the second AP so that the station connects with the second AP, and for transmitting a roaming command to the station after determining that the signal strength is compliant with predetermined roaming rules so that the station roams to the second AP according to the roaming command.

The disclosed roaming method using a WAC to select an AP includes the steps of: connecting a station to a first AP; sending first target station register message from the station to a WAC via the first AP; after a second AP detects the station, sending target station query message to the WAC so that the WAC sends monitor AP register message to the station via the first AP; establishing a connection between the station and the second AP; sending the signal strength between the station and the second AP to the WAC; after the WAC to determine that the signal strength is compliant with predetermined roaming rules, sending a roaming command to the station; roaming the station to the second AP according to the roaming command.

The invention differs from the prior art in that the signal strength with the station from an AP of the station is sent to the WAC. The WAC then determines whether the signal strength is compliant with predetermined roaming rules. If so, then the station is notified about an AP for the connection. This technique solves problems in the prior art and achieves the effect of fast roaming.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

According to the invention, when a wireless access controller (WAC) determines that there is a second access point (AP) around a station (STA) that has better connection quality than the currently connected first AP, the WAC notifies the station to roam from the first AP to the second AP.

In this specification, the AP connected to the station 100 before roaming is called the first AP, and the AP connected to the station 100 after roaming is called the second AP. Besides, AP's generally refer to all AP's in the wireless network of the station. Other AP's refer to the other AP's that are not connected with the station.

Figure 1A:
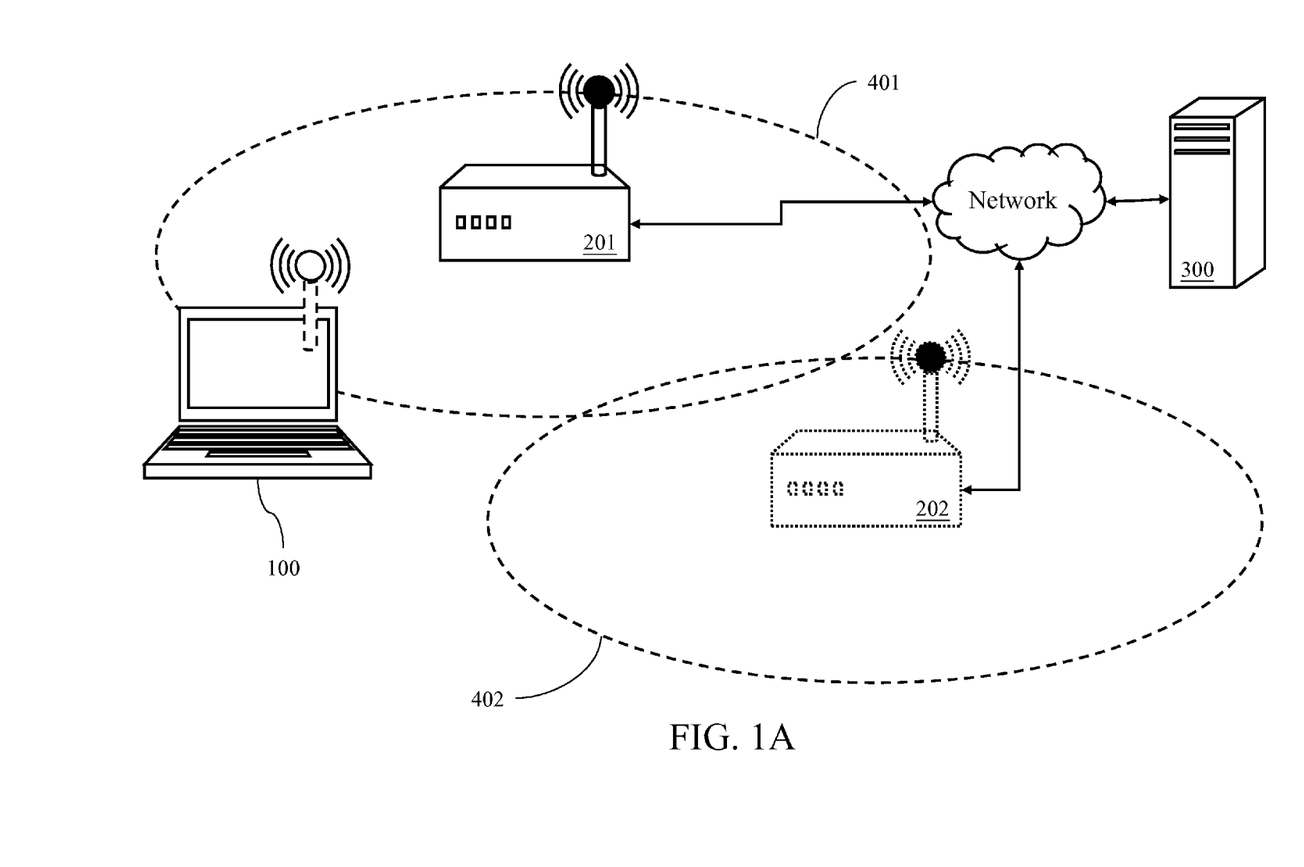
FIGS. 1A and 1B are schematic view of roaming according to the invention.
Figure 1B:
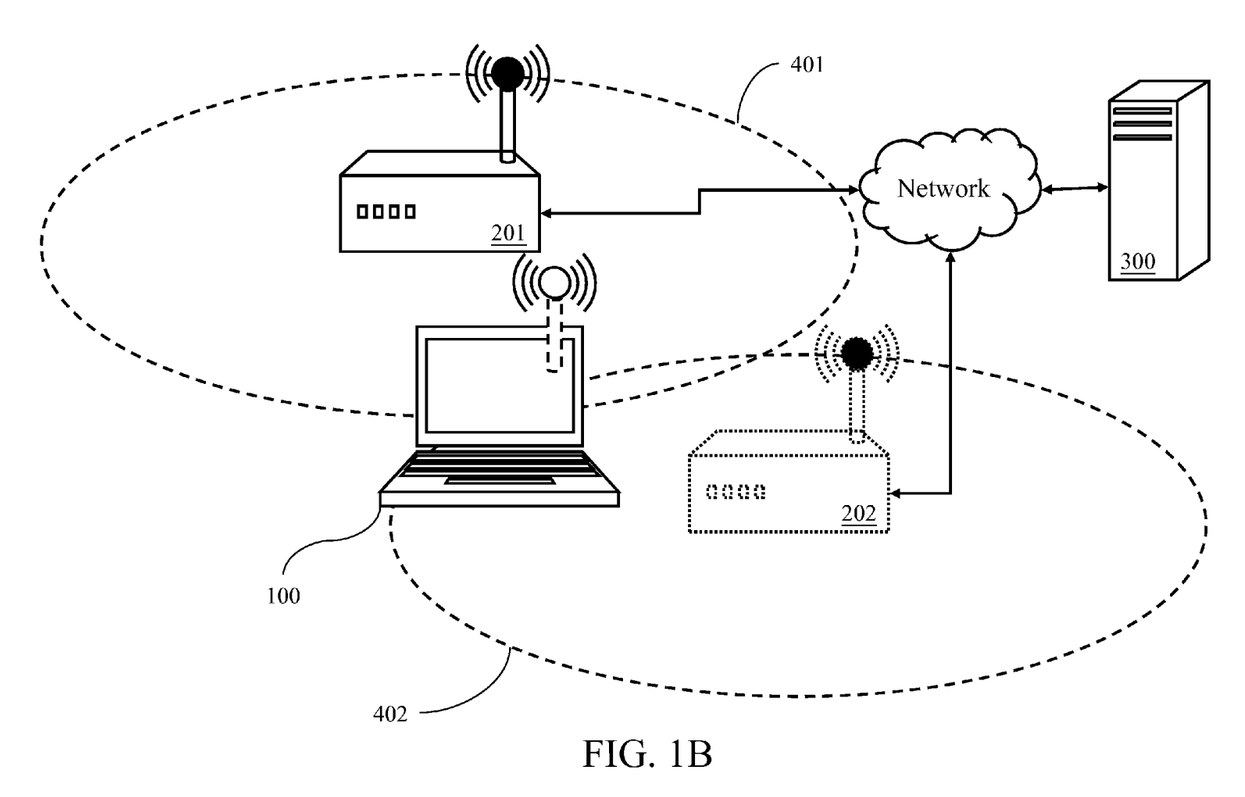

Please refer to FIGS. 1A and 1B for the disclosed system. As shown in the drawings, the disclosed system includes a station 100, a first AP 201, a second AP 202, and a WAC 300.

The station 100 is mobile. When entering a wireless network, the station 100 detects surrounding AP's and uses 4-way handshake to connect to one of the detected AP's. In this case, the currently connected AP is called the first AP. The station 100 also continues to detect the signal strength of other AP's after connecting to the current AP. The signal strength is including but not limited to receive signal strength indicator (RSSI).

Besides, after receiving monitor AP register message transmitted from the WAC 300, the station 100 also establishes a connection with the AP indicated therein.

Whether the station 100 establishes the connection with the AP using the 4-way handshake or by following the monitor AP register message transmitted from the WAC 300, a communication packet is always transmitted before the station connects to the AP so that data can be transmitted before the connection. In some embodiments, the fourth MAC address in the communication packet can be the roam domain of the station 100. However, the roam domain of the invention is not limited to this example.

After the station 100 connects to the first AP 201, it can transmit target station register message via the first AP 201 to the WAC 300. In particular, the first target station register message transmitted by the station 100 may contain a security key of the station 100 and a 4-way handshake identification code. However, the first target station register message of the invention is not limited to this example.

Likewise, after connecting to the second AP 202, the station 100 can transmit second target station register message to the WAC 300 via the second AP 202. The second target station register message transmitted by the station 100 may contain the security key and roam identification code of the station 100. However, the second target station register message of the invention is not limited to this example.

The station 100 further receives a roaming command transmitted from the WAC 300 via the first AP 201 or the second AP 202 and then roams to the second AP 202 in the roaming command.

The first AP 201 has a first signal covering range 401, allowing multiple stations therein to connect and forwarding the first target station register message transmitted from the station 100 to the WAC 300. The first AP can also store the security key in the first target station register message after receiving the first target station register message.

After connecting to the station 100, the first AP 201 also monitors whether the station 100 is transmitting communication packets with other AP's by sniffing. When the station 100 is found to transmit communication packets with other AP's by sniffing, the first AP 201 further determines whether the roam domain in the communication packet is the same as the roam domain of the station. If the same, the first AP 201 obtains the signal strength between the first AP 201 and the station 100. The obtained signal strength is transmitted to the WAC 300. In this invention, the signal strength transmitted by the first AP 201 is referred to as the first signal strength.

In fact, the first AP 201 uses a specific frequency (i.e., specific time interval) to transmit the signal strengths of all the stations connected with the first AP 201. That is, after the first AP 201 finds the communication packets transmitted from the station 100 to other AP's in a specific time (time interval) by sniffing, the first AP 201 transmits the signal strength with the station 100 to the WAC 300. If within a certain time interval the first AP 201 does not find communication packets between the station 100 and other AP's by sniffing, then the first AP 201 does not transmit the signal strength with the station 100.

Besides, after receiving the monitor AP register message transmitted from the WAC 300, the first AP 201 can forward the received monitor AP register message to the station 100.

The second AP 202 has a second signal covering range 402. After the station 100 moves into the second signal covering range 402, the second AP 202 tries to find the connection packets transmitted between the station 100 and the first AP 201 by sniffing. For example, such connection packets include the Keep Alive packet transmitted from the station 100 to the first AP or the ACK packet returned from the first AP to the station 100.

After finding the connection packets transmitted between the station 100 and the first AP 201 by sniffing, the second AP 202 can obtain the MAC address of the station 100 from the connection packet and transmits target station query message containing the MAC address of the station 100 to the WAC 300.

After the WAC 300 returns a response of the target station query message, the second AP 202 obtains the roam domain corresponding to the MAC address of the station 100 from the response and determines whether the roam domain in the response is the same as the roam domain of the station 100. When the roam domain in the response and the roam domain of the station 100 are the same, the identity of the station is confirmed.

After verifying the identity of the station 100, the second AP 202 transmits the signal strength with the station 100 to the WAC 300. In the invention, the signal strength transmitted from the second AP 202 to the WAC 300 is referred to as the second signal strength.

Similar to the first AP 201, after finding second communication packets transmitted between the station 100 and other AP's at specific time interval by sniffing, the second AP 202 can transmit the second signal strength to the WAC 300.

Generally speaking, the first AP 201 can write the signal strengths of all station connected to the first AP 201 into signal strength report data and transmit the signal strength report data at a specific frequency to the WAC 300. The second AP 202 may use the same method for the first AP 201 to transmit the first signal strength and transmit the signal strength report data to the WAC 300 after writing the second signal strength into the signal strength report data. However, the method for the first AP 201 to transmit the first signal strength to the WAC 300 or for the second AP 202 to transmit the second signal strength is not limited to the example disclosed herein.

It should be noted that the first AP 201 and the second AP 202 merely provide different functions to the station 100. In practice, they are not much different. That is, after the station 100 connects to some AP using the 4-way handshake or the station 100 roams from one AP to another, the AP to the station 100 is the first AP according to the invention. If another station roams from some other AP to the same AP, then the AP to the roaming station is the second AP in the invention.

The WAC 300 receives the first target station register message transmitted from the station 100 via the first AP 201, the first signal strength between the station 100 and the first AP 201 from the first AP 201, the second target station register message transmitted from the station 100 via the second AP 202, the target station query message transmitted from the second AP 202, and the second signal strength between the station 100 and the second AP 202 via the second AP 202.

After receiving the target station query message transmitted from the second AP 202, the WAC 300 returns a response to the second AP 202 and transmits the monitor AP register message to the station 100 via the first AP 201.

The WAC 300 also determines whether the second signal strength between the second AP 202 and the station 100 is compliant with predetermined roaming rules. If so, it means that the best connecting AP is the second AP 202 for the station 100. Therefore, the WAC 300 can send a roaming command to the station 100 so that the station 100 roams from the first AP 201 to the second AP 202 accordingly.

The predetermined roaming rules according to the invention differ for different antennas used by the AP's. In some embodiments, the antenna used by AP's is a leak cable. In this case, the roaming rules can be whether it is the first time for the second AP 202 to send the second signal strength between the second AP 202 and the station 100 to the WAC 300. If so, then the second signal strength is compliant with the roaming rules. In some embodiments, the AP uses a direction antenna. In this case, the roaming rules can be that the second signal strength is greater than a predetermined strength threshold. Yet in some embodiments, the AP uses an omni antenna. In this case, the roaming rules are for the second signal strength greater than the first signal strength.

In practice, when the antenna of AP's is a direction or omni antenna, the predetermined roaming rules often also include that whether the duration for the second signal strength to be greater than the first signal strength or the strength threshold exceeds a predetermined duration threshold, in addition to the above-mentioned one that the second signal strength is greater than the first signal strength or the strength threshold. That is, after the WAC 300 determines that the second signal strength is greater than the first signal strength or the strength threshold, it further determines whether the duration when the first signal strength or the strength threshold exceeds a predetermined duration threshold. Only so does the WAC 300 determine that the second signal strength is compliant with the predetermined roaming rules, and send a roaming command to the station 100.

After receiving the second target station register message transmitted from the station 100, the WAC 300 deletes the connection status originally stored for the station 100 and records that the station 100 has connected to the second AP 202.

In the following, one embodiment is used to explain the disclosed system and method. Please refer to FIG. 2A for the primary flowchart of the disclosed roaming method using a WAC to select an AP. In this embodiment, the station 100 is a laptop computer. However, the station 100 in this invention is not limited to this example. Any device using the IEEE 802.11 communication protocol can be the station of the invention, such as mobile phones, personal digital assistants (PDA's), etc.

Suppose the wireless network structure in this embodiment is as shown in FIG. 1A. When the station 100 enters the first signal covering range 401 of the first AP 201 (step 501), but not the second signal covering range 402 of the second AP 202, the station 100 can connect to the first AP 201 (step 540) using 4-way handshake.

Figure 2A:
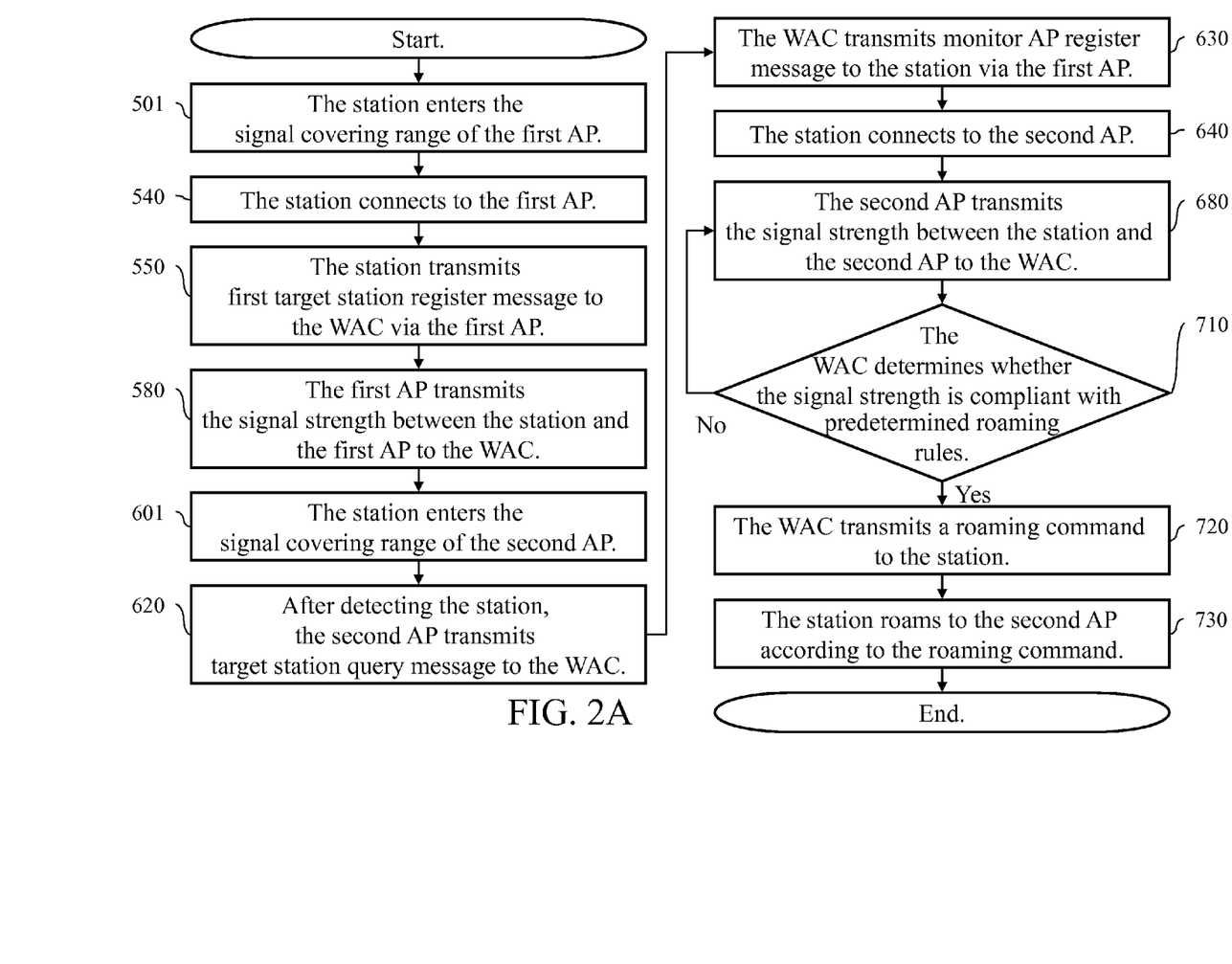
FIG. 2A is a flowchart of the disclosed roaming method using a WAC to select an AP.

After connecting to the first AP 201 (step 540), the station 100 can transmit first target station register message to the first AP 201, thereby forwarding the first target station register message via the first AP 201 to the WAC 300 (step 550).

After the station 100 transmits the first target station register message via the first AP 201 to the WAC 300 (step 550), the first AP 201 continues to detect the first signal strength between the station 100 and the first AP 201 at a specific time interval, and sends the detected first signal strength to the WAC 300 (step 580). In particular, the first signal strength in this embodiment is "receive signal strength indicator (RSSI)", and the time interval for the first AP 201 to detect the first signal strength is 50 ms or 100 ms, for example. The invention is not restricted by such examples.

Figure 2B:
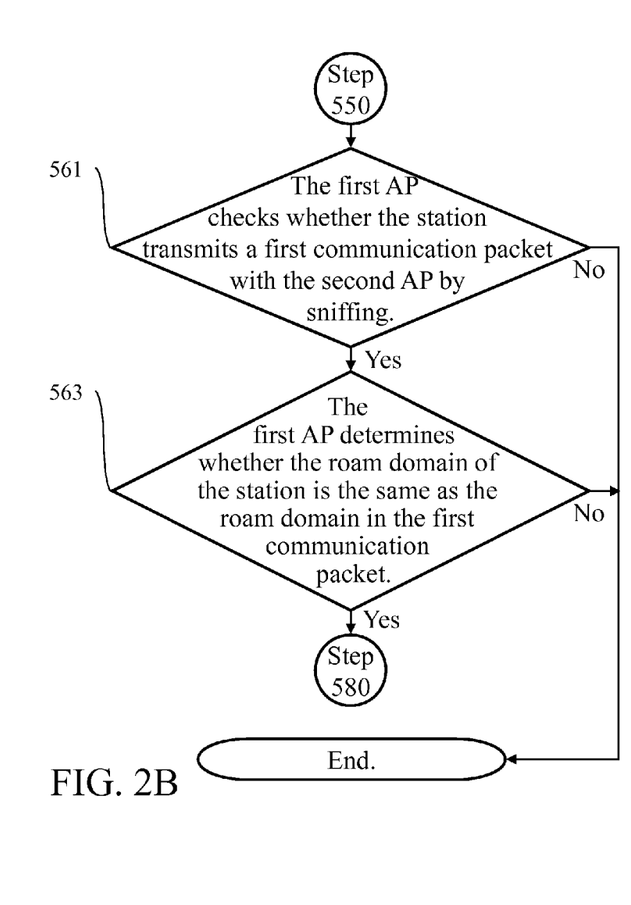
FIG. 2B is an appended flowchart of transmitting the first signal strength by the first AP according to the invention.

To reduce the load on the WAC 300, the first AP 201 can first check whether the station 100 and the second AP 202 are transmitting communication packets by sniffing before transmitting the first signal strength to the WAC 300 (step 561), as shown in FIG. 2B. If the first AP 201 does not find communication packets transmitting between the station 100 and the second AP 202 by sniffing, then it means that the station 100 has not moved into the second signal covering range 402 of the second AP 202. The station 100 has only the first AP 201 for connection at the moment, and there is no roaming. Therefore, the WAC 300 does not need to process signal strengths between the station 100 and various AP's. The first AP 201 does not need to transmit the detected first signal strength.

If the station 100 has moved into the intersection of the first signal covering range 401 of the first AP 201 and the second signal covering range 402 of the second AP 202 (step 601), as shown in FIG. 1B, then the station 100 will detect the existence of the second AP 202 due to the continuous AP detection. Afterwards, the station 100 exchanges data with the second AP 202 to generate communication packets. Thus, the first AP 201 that finds the packets transceived by the station 100 can find the communication packets transmitted between the station 100 and the second AP 202 by sniffing.

After finding the communication packets transmitted between the station 100 and the second AP 202 by sniffing, the first AP 201 further determines whether the roam domain in the communication packets is the same as the roam domain of the station 100 (step 563). Since the communication packet is the packet exchanged between the station 100 and the second AP 202, the first AP 201 can determine that the roam domain therein is the same as the roam domain of the station.

Afterwards, the first AP 201 detects the first signal strength between the first AP 201 and the station 100, and transmits the detected first signal strength to the WAC 300 (step 580). In this embodiment, suppose the first AP 201 writes the first signal strength between the first AP 201 and the station 100 into signal strength report data and transmits the signal strength report data with the first signal strength to the WAC 300. However, the method used by the first AP 201 to transmit the first signal strength is not limited to this example.

In practice, the first AP 201 continues to transmit the first signal strength between the first AP 201 and the station 100 to the WAC 300 at a specific time interval. In particular, the time interval for the first AP 201 to transmit the first signal strength to the WAC 300 is 50 ms or 100 ms, for example. The invention is not restricted by such examples.

After the station 100 moves into the intersection between the first signal covering range 401 of the first AP 201 and the second signal covering range 402 of the second AP 202 (step 601), the second AP 202 can then detect the existence of the station 100 while transmitting packets in between. The second AP 202 obtains the MAC address of the station 100 from the packets transmitted between the station 100 and the first AP 201, and transmits the target station query message containing the MAC address of the station 100 to the WAC 300 (step 620).

After receiving the target station query message transmitted from the second AP 202, the WAC 300 transmits the monitor AP register message to the first AP 201. After receiving the monitor AP register message transmitted from the WAC 300, the first AP 201 forwards the received monitor AP register message to the station 100 (step 630).

After receiving the monitor AP register message forwarded by the WAC 300 via the first AP 201 (step 630), the station 100 establishes a connection with the second AP according to the monitor AP register message (step 640).

After receiving the target station query message, the WAC 300 can find the roam domain of the station 100 according to the MAC address thereof. Afterwards, the WAC 300 transmits a response containing the roam domain of the station 100 to the second AP 202. The second AP 202 then uses the roam domain in the received response to confirm the identity of the station 100.

After verifying the identity of the station 100, the second AP 202 continues to detect the second signal strength between the station 100 and the second AP 202 at a specific time interval and transmits the detected second signal strength to the WAC 300 (step 680). In particular, the second signal strength in this embodiment is RSSI, and the time interval used by the second AP 202 to detect the second signal strength is 50 ms or 100 ms, for example. However, the invention is not limited to such examples.

Figure 2C:
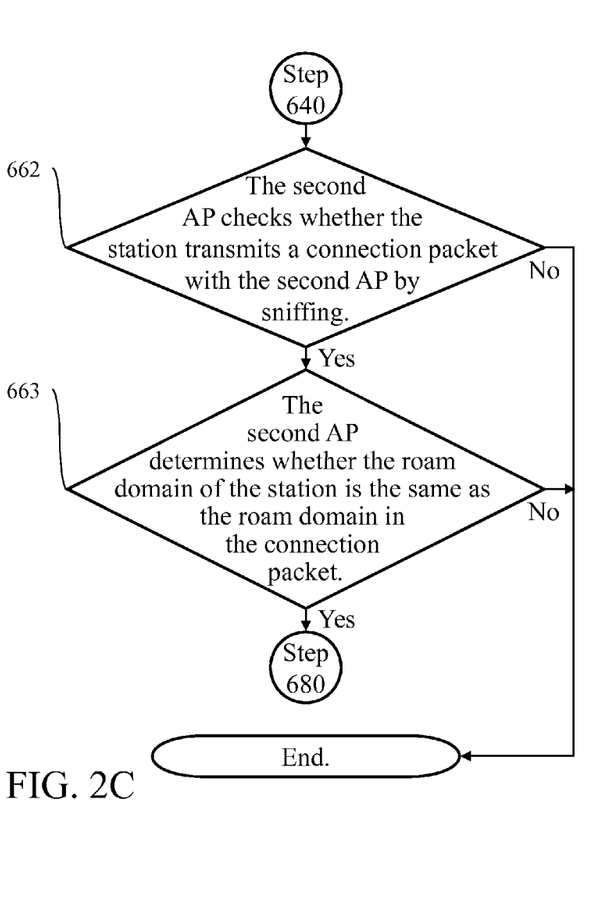
FIG. 2C is an appended flowchart of transmitting the second signal strength by the second AP according to the invention.

Likewise, to reduce the load of the WAC 300, the invention can first check whether the station 100 is transmitting connection packets with the first AP 201 by sniffing before the second AP 202 transmits the second signal strength to the WAC 300, as shown in FIG. 2C (step 662).

Because of the Wi-Fi property, when the station 100 moves to the intersection of the first signal covering range 401 of the first AP 201 and the second signal covering range 402 of the second AP 202, the second AP 202 can find the connection packets transmitted between the station 100 and the first AP 201 by sniffing. Therefore, the second AP 202 can determine whether the roam domain recorded in the connection packet is the same as the roam domain of the station 100 (step 663). Since the connection packet obtained by the second AP 202 is the packet for the station 100 to confirm the connection with the first AP 201, the second AP 202 determines that the roam domain in the connection packet is the same as the roam domain of the station 100.

Figure 2D:
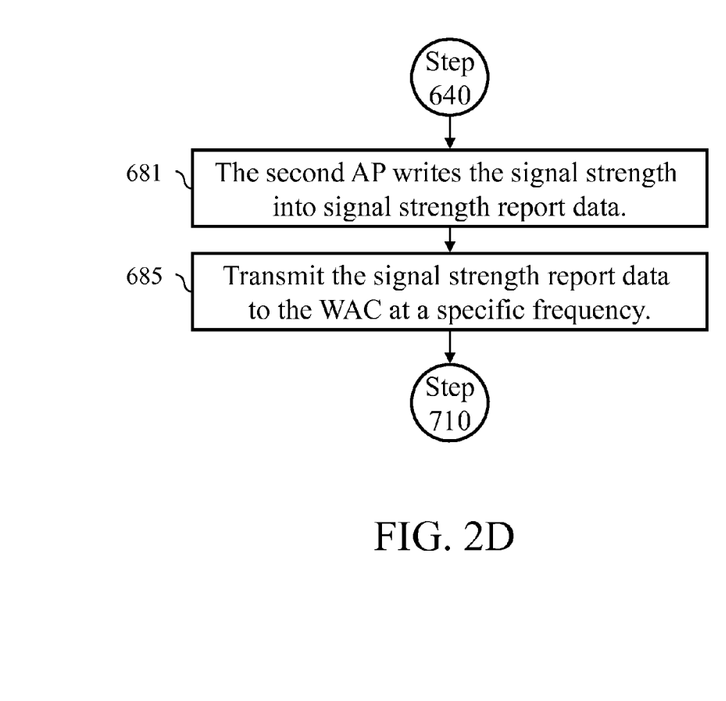
FIG. 2D is a detailed flowchart of transmitting the first signal strength by the first AP according to the invention.

Afterwards, the second AP 202 detects the second signal strength between the second AP 202 and the station 100, and sends the detected second signal strength to the WAC 300 (step 680). As shown in FIG. 2D, the second AP 202 can use the same method as the first AP 201 to write the second signal strength between the second AP 202 and the station 100 into signal strength report data (step 681) and then sends the signal strength report data containing the second signal strength to the WAC 300 (step 685). However, the method of transmitting the second signal strength by the second AP 202 is not limited to this particular example.

Besides, the second AP 202 uses the same time interval as the first AP 201 (i.e., the same frequency) to continuously transmit the second signal strength between the second AP 202 and the station 100 to the WAC 300.

After the first AP 201 transmits the detected first signal strength to the WAC (step 580) and the second AP 202 transmits the detected first signal strength to the WAC 300 (step 680), the WAC 300 determines whether the second signal strength is compliant with predetermined roaming rules (step 710), thereby selecting a best AP for the station 100. The time interval for the WAC 300 to determine whether the second signal strength is compliant with the predetermined roaming rules is usually the same as the time interval used by the first AP 201/the second AP 202 to transmit the first signal strength/the second signal strength. However, the invention is not limited to this possibility. Moreover, the predetermined roaming rules depend on the antenna system.

In this embodiment, if the antennas used by the station 100 and the AP's are leak cables, the roaming rules include whether it is the first time for the second AP 202 to transmit the second signal strength between the second AP 202 and the station 100 to the WAC 300. In this case, if it is determined to be the first time to receive the second signal strength between the second AP 202 and the station 100 from the second AP 202, then the WAC 300 determines that the second signal strength is compliant with the roaming rules. If the second AP 202 has previously transmitted the second signal strength to the WAC 300, then the WAC 300 determines that the second signal strength is not compliant with the roaming rules.

If the antennas used by the station 100 and the AP's are direction antennas, the roaming rules include whether the second signal strength is greater than a predetermined strength threshold. That is, after determining that the second signal strength transmitted by the second AP 202 is greater than the predetermined strength threshold, the WAC 300 determines that the second signal strength is compliant with the roaming rules. The roaming rules can further include that the duration for the second signal strength to be greater than the predetermined strength threshold exceeds a predetermined duration threshold. In this case, after determining that the second signal strength transmitted by the second AP 202 is greater than the predetermined strength threshold, the WAC 300 further checks if the duration for the second signal strength to be greater than the predetermined strength threshold exceeds a predetermined duration threshold. Only so does the WAC 300 determine that the second signal strength is compliant with the roaming rules.

When the antennas used by the station 100 and the AP's are omni antennas, the roaming rules in this embodiment include that the second signal strength is greater than the first signal strength. Even more, as in the case of the direction antenna, the roaming rules further include that the duration for the second signal strength to be greater than the first signal strength exceeds a predetermined duration threshold. Thus, in addition to determining that the second signal strength from the second AP 202 is greater than the first signal strength from the first AP 201, the WAC 300 has to further determine that the duration for the second signal strength to be greater than the first signal strength also exceeds the predetermined duration threshold. Only so does the WAC determine that the second signal strength is compliant with the roaming rules. Otherwise, the WAC 300 does not consider the second AP 202 better than the first AP 201 for the station 100 to connect.

After determining that the second signal strength is compliant with the predetermined roaming rules, the WAC 300 transmits a roaming command to the station 100 via the first AP 201 and/or the second AP 202 (step 720).

After the WAC 300 transmits the roaming command to the station 100 via some AP (step 720), the station 100 roams from the first AP 201 to the second AP 202 according to the roaming command transmitted from the WAC 300 (step 730).

Figure 2E:
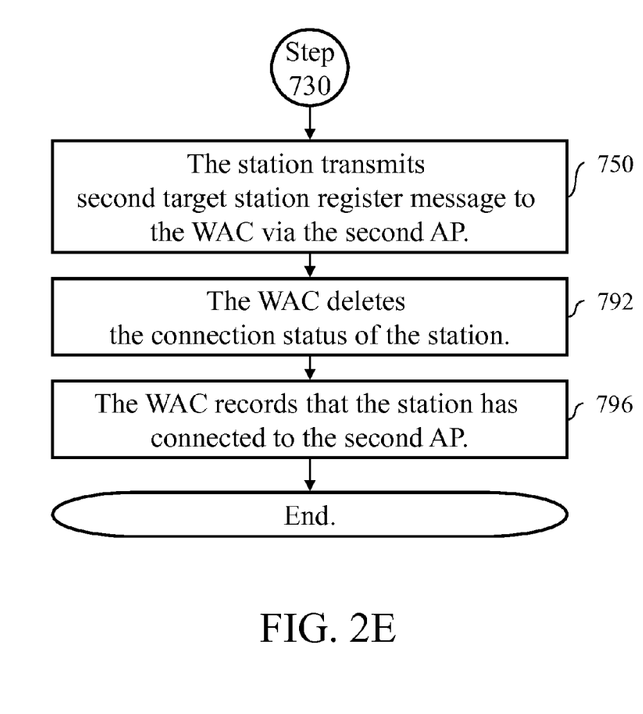
FIG. 2E is an appended flowchart of disclosed roaming method using a WAC to select an AP.

Please refer to FIG. 2E. After the station 100 roams to the second AP 202, the station 100 transmits the second target station register message to the WAC 300 via the second AP 202 (step 750).

After receiving the second target station register message transmitted from the station 100, the WAC 300 can delete the connection status thereof (step 792), and records that the station 100 has connected to the second AP 202 (step 796). This completes the roaming process.

In the above-mentioned embodiment, if the second AP does not find the connection packet transmitted between the station 100 and the first AP 201 by sniffing, it means that the station 100 has moved out of the first signal covering range 401 of the first AP 201. The station 100 is left with only the second AP 202 for connection at this moment. Therefore, there is no need for roaming. In this case, the WAC 300 does not need to process the signal strengths between the station 100 and various AP's. The second AP 202 does not need to transmit the detected first signal strength.

In summary, the invention differs from the prior art in that signal strengths between the station and various AP's are sent to the WAC, and the WAC determines whether any of the signal strengths is compliant with the predetermined roaming rules and notifies the station to select an appropriate AP accordingly. This technique can solve the problem in the prior art that the station cannot simultaneously take care of network connection quality and data transmission efficiency. The invention further achieves the goal of fast roaming.

Furthermore, the disclosed roaming method using a WAC to select an AP can be implemented in software, hardware, or the combination thereof. It can also be implemented in a centralized way in a computer system or in a distributive way among different elements of several connected computer systems.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A roaming method using a wireless access controller (WAC) to select an access point (AP), comprising the steps of:
   connecting a station (STA) to a first AP;
   transmitting first target station register message comprising a security key from the station to a WAC via the first AP, so that the security key is stored at the first AP and the WAC;
   after a second AP detects the station, transmitting target station query message to the WAC;
   sniffing communication packets between the station and the WAC by the second AP, so that the second AP obtains an MAC address of the station;
   transmitting a signal comprising a roam domain of the station corresponding to the MAC address by the WAC to the second AP;
   comparing the roam domain in the signal and the roam domain recorded in the MAC address by the second AP;
   transmitting a signal strength between the station and the second AP to the WAC by the second AP, if the roam domain in the signal and the roam domain recorded in the MAC address is determined as the same;
   transmitting monitor AP register message to the station via the first AP by the WAC;
   after the WAC determines whether the signal strength is compliant with predetermined roaming rules, transmitting a roaming command to the station; and
   the station roams to the second AP according to the roaming command.

2. The roaming method using a WAC to select an AP of claim 1 further comprising the step of transmitting the signal strength between the station and the first AP to the WAC at a specific frequency after the first AP finds a communication packet transmitted between the station and the second AP by sniffing and determines that the roam domain in the communication packet is the same as the roam domain of the station, following the step of transmitting first target station register message from the station to a WAC via the first AP.

3. The roaming method using a WAC to select an AP of claim 1 further comprising the step of continuously transmitting the signal strength between the second AP and the station to the WAC after the second AP finds a connection packet transmitted between the station and the first AP by sniffing and determines that the roam domain in the connection packet is the same as the roam domain of the station, following the step of a second AP detects the station.

4. The roaming method using a WAC to select an AP of claim 1, wherein the step of transmitting a signal strength between the station and the second AP from the second AP to the WAC is performed by writing the signal strength by the second AP into signal strength report data and transmitting the signal strength report data to the WAC at a specific frequency.

5. The roaming method using a WAC to select an AP of claim 1 further comprising the step of deleting the connection status of the station and recording that the station has connected to the second AP after the station transmits second target station register message via the second AP to the WAC, following the step of roaming the station to the second AP according to the roaming command.

6. A roaming system using a WAC to select an AP, comprising:
   a station;
   a first AP for the station to connect and for forwarding first target station register message comprising a security key transmitted from the station, so that the security key is stored at the first AP and the WAC;
   a second AP for transmitting target station query message after detecting the station, and
   sniffing communication packets between the station and the WAC, so that the second AP obtains an MAC address of the station; and
   a WAC for transmitting a signal comprising a roam domain of the station corresponding to the MAC address by the WAC to the second AP,
   wherein the second AP compares the roam domain in the signal and the roam domain recorded in the MAC address and transmits a signal strength between the station and the second AP to the WAC, if the roam domain in the signal and the roam domain recorded in the MAC address is determined as the same, and the WAC transmits monitor AP register message to the station via the first AP and a roaming command to the station after the WAC determines whether the signal strength is compliant with predetermined roaming rules, and the station roams to the second AP according to the roaming command.

7. The roaming system using a WAC to select an AP of claim 6, wherein the predetermined roaming rules are that the signal strength is greater than a signal strength transmitted by the first AP and that a duration for the signal strength to be greater than the signal strength transmitted by the first AP exceeds a predetermined duration threshold, that the signal strength between the second AP and the station is first transmitted by the second AP, or that the signal strength is greater than a predetermined strength threshold.

8. The roaming system using a WAC to select an AP of claim 6, wherein the first AP transmits the signal strength between the station and the first AP to the WAC after finding a communication packet transmitted between the station and the second AP by sniffing and determining that the roam domain in the communication packet is the same as the roam domain of the station.

9. The roaming system using a WAC to select an AP of claim 6, wherein the second AP continuously transmits the signal strength to the WAC after finding a connection packet transmitted between the station and the first AP by sniffing and determining that the roam domain in the connection packet is the same as the roam domain of the station.

10. The roaming system using a WAC to select an AP of claim 6, wherein the station forwards second target station register message via the second AP to the WAC after roaming to the second AP, the WAC deletes the connection status of the station and records that the station has connected to the second AP after receiving the second target station register message.

* * * * *